(12) United States Patent
Wehinger

(10) Patent No.: US 8,656,243 B2
(45) Date of Patent: Feb. 18, 2014

(54) RADIO RECEIVER AND METHOD FOR CHANNEL ESTIMATION

(75) Inventor: Joachim Wehinger, Taufkirchen (DE)

(73) Assignee: Intel Mobile Communications GmbH, Neubiberg (DE)

( * ) Notice: Subject to any disclaimer, the term of this patent is extended or adjusted under 35 U.S.C. 154(b) by 425 days.

(21) Appl. No.: 12/686,791

(22) Filed: Jan. 13, 2010

(65) Prior Publication Data

US 2011/0173508 A1 Jul. 14, 2011

(51) Int. Cl.
*H04L 1/18* (2006.01)
*H03H 7/30* (2006.01)

(52) U.S. Cl.
USPC .......................................... 714/751; 375/232

(58) Field of Classification Search
None
See application file for complete search history.

(56) References Cited

U.S. PATENT DOCUMENTS

| | | | | |
|---|---|---|---|---|
| 6,175,588 | B1 * | 1/2001 | Visotsky et al. | 375/148 |
| 6,763,075 | B2 * | 7/2004 | Zhengdi et al. | 375/341 |
| 7,003,029 | B2 * | 2/2006 | Doetsch et al. | 375/232 |
| 7,027,533 | B2 * | 4/2006 | Abe et al. | 375/341 |
| 7,092,706 | B2 * | 8/2006 | Yang | 455/423 |
| 7,428,267 | B2 * | 9/2008 | Lee et al. | 375/260 |
| 7,676,009 | B2 * | 3/2010 | Yen et al. | 375/350 |
| 7,684,526 | B2 * | 3/2010 | Li et al. | 375/347 |
| 7,937,643 | B1 * | 5/2011 | Chang et al. | 714/758 |
| 8,306,000 | B2 * | 11/2012 | Mouhouche | 370/335 |
| 2002/0126748 | A1 * | 9/2002 | Rafie et al. | 375/229 |
| 2005/0180534 | A1 * | 8/2005 | Brotje et al. | 375/350 |
| 2008/0160912 | A1 * | 7/2008 | Kim et al. | 455/15 |
| 2008/0310568 | A1 | 12/2008 | Sander | |
| 2009/0031185 | A1 * | 1/2009 | Xhafa et al. | 714/751 |
| 2009/0245091 | A1 | 10/2009 | Lin et al. | |
| 2009/0296798 | A1 | 12/2009 | Banna et al. | |
| 2010/0027701 | A1 | 2/2010 | Choi et al. | |
| 2010/0180173 | A1 * | 7/2010 | Batra et al. | 714/751 |

FOREIGN PATENT DOCUMENTS

| | | |
|---|---|---|
| CN | 1204189 A | 1/1999 |
| CN | 1705237 A | 12/2005 |
| CN | 1711712 A | 12/2005 |

OTHER PUBLICATIONS

Tao Shi; Lei Cao; , "Combining techniques and segment selective repeat on turbo coded hybrid ARQ," Wireless Communications and Networking Conference, 2004. WCNC. 2004 IEEE , vol. 4, no., pp. 2115-2119 vol. 4, Mar. 21-25, 2004.*
"Low Complexity Stopping Criteria for UMTS Turbo-Decoders", Frank Gilbert, Frank Kienle, and Norbert When, Microelectronic System Design Research Group. University of Kaiserslautern, 5 pgs.
"Multi-User Detection for Improving VoIP Capacity and Coverage in WCDMA Uplink", Y.-P. Eric Wang and Stephen J. Grant, Ericsson Research, 5 pgs.

(Continued)

*Primary Examiner* — Daniel McMahon
(74) *Attorney, Agent, or Firm* — Eschweiler & Associates, LLC

(57) ABSTRACT

A radio receiver includes an input terminal to receive a first radio signal, an equalizer, coupled to the input terminal, to equalize the first radio signal and to output an equalized signal and a first channel estimator, coupled to the input terminal and the equalizer, to estimate first channel parameters by using the first radio signal and a signal derived from the equalized signal. The radio receiver may contain a controller implementing a HARQ protocol and a HARQ buffer to store likelihood information based on the equalized signal. The radio receiver may contain a reconstruction unit to provide the signal derived from the equalized signal based on a content of the HARQ buffer.

25 Claims, 7 Drawing Sheets

(56) References Cited

OTHER PUBLICATIONS

"Advanced receiver for WCDMA terminal platforms and base stations", Gregory E. Bottomley, Douglas A. Cairns, Carmela Cozzo, Tracy L. Fulghum, Ali S. Khayrallak, Per Lindell, Magnus Sundelin, and Y.-P. Eric Wang, Ericsson Review No. 2, 2006, pp. 54-58.

U.S. Appl. No. 12/693,089, filed Jan. 25, 2010, 54 pages.
Office Action dated Apr. 4, 2013 for U.S. Appl. No. 12/693,089.
Notice of Allowance dated Oct. 8, 2013 for U.S. Appl. No. 12/693,089. 21 pages.

* cited by examiner

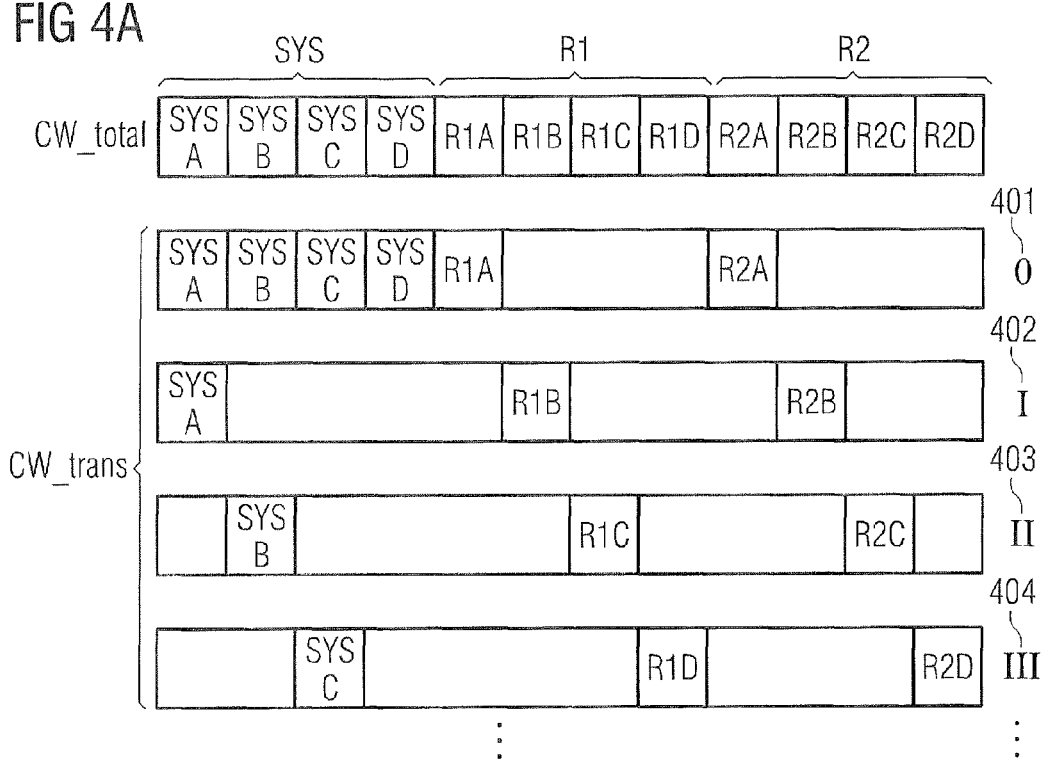
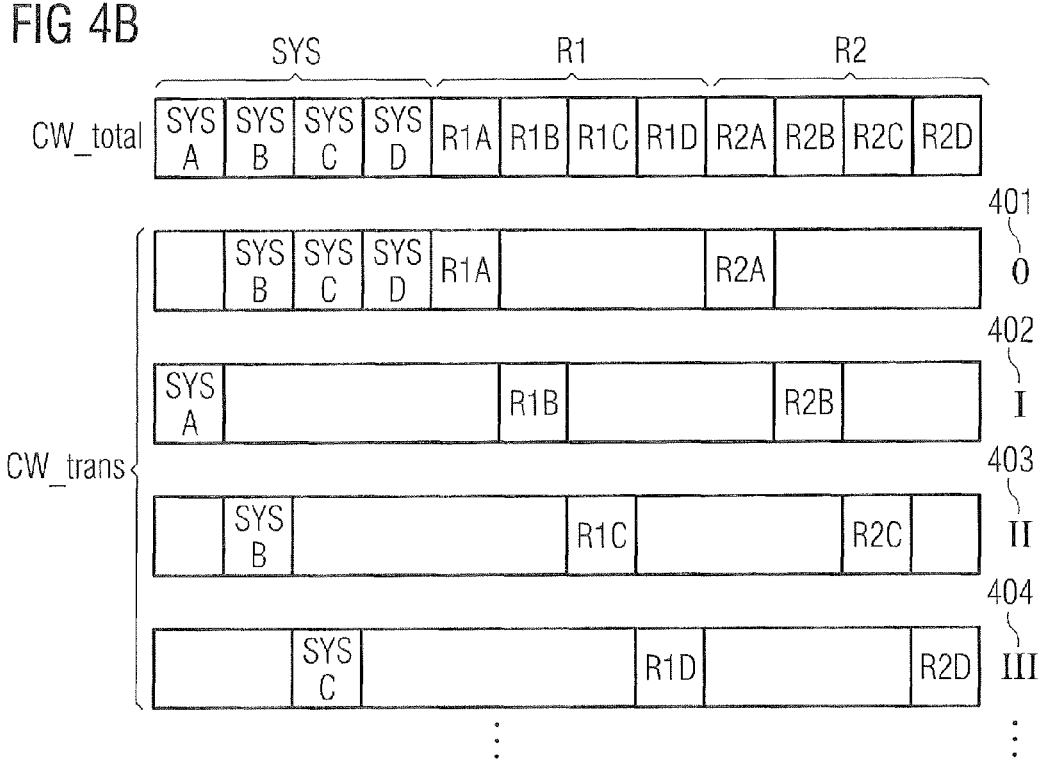

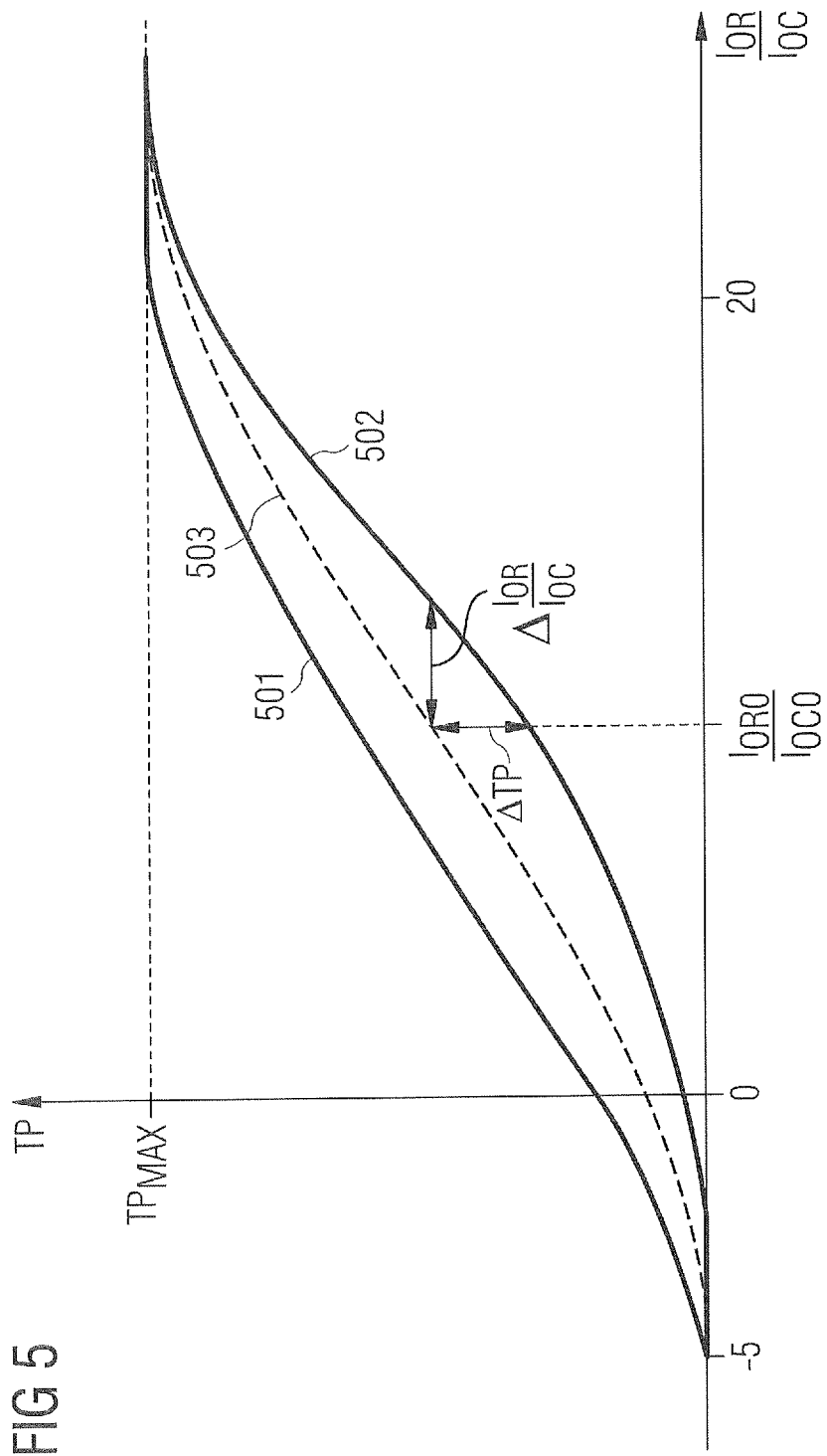

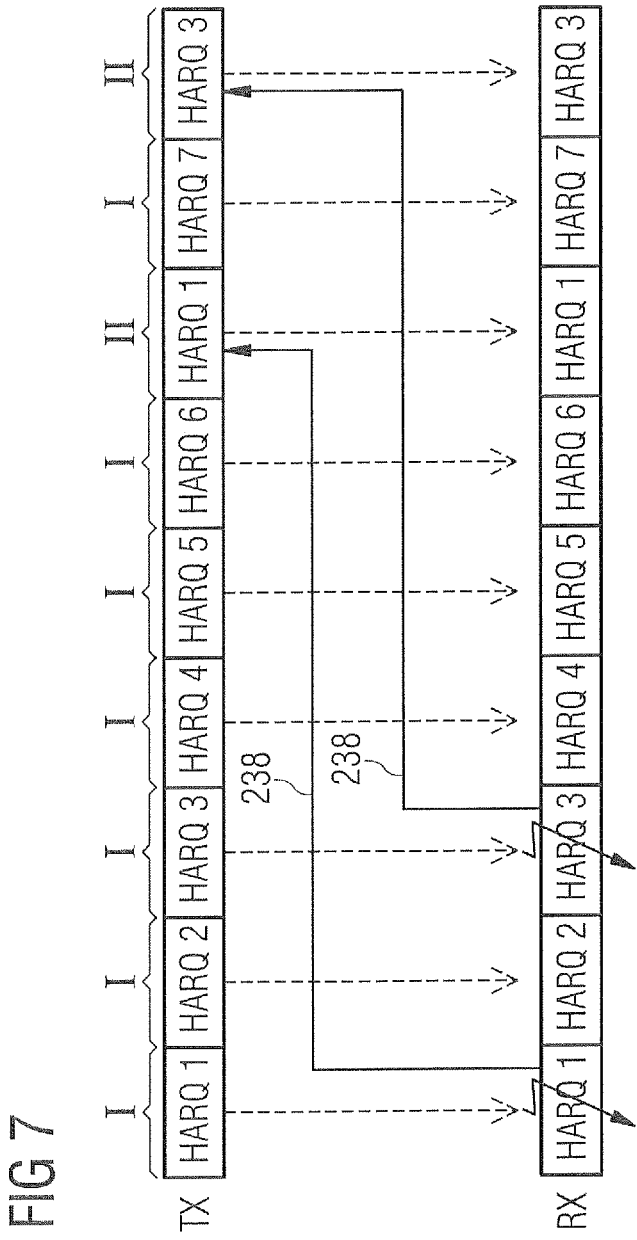

RADIO RECEIVER AND METHOD FOR CHANNEL ESTIMATION

FIELD OF THE INVENTION

This invention relates to a radio receiver and a method for estimating channel parameters of a radio channel.

BACKGROUND OF THE INVENTION

Radio receivers are electronic circuits that receive radio signals and use electronic filtering to compensate for effects of a radio channel disturbing the transmission of the radio signal. For the compensation of the distortion due to the radio channel the radio receiver may estimate channel parameters of the radio channel to equalize the received radio signals by applying the inverse channel parameters to the received radio signals.

The estimation of the channel parameters may depend on the signal-to-noise ratio of the received radio signals. Increasing the transmission power of the radio signals or reducing the noise of the transmission channel improves the channel estimation quality.

For these and other reasons there is a need for the present invention.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 4a schematically illustrates a redundancy version scheme of a radio signal of an HSDPA scheme according to one embodiment.

FIG. 4b schematically illustrates a redundancy version scheme of a radio signal of an LTE scheme according to one embodiment.

FIG. 5 shows a diagram schematically illustrating data throughput versus signal-to-noise ratio of a radio receiver according to one embodiment.

FIG. 7 shows a block diagram schematically illustrating a transmission sequence of data words of a first radio signal according to one embodiment.

DETAILED DESCRIPTION OF THE INVENTION

Figure 1:
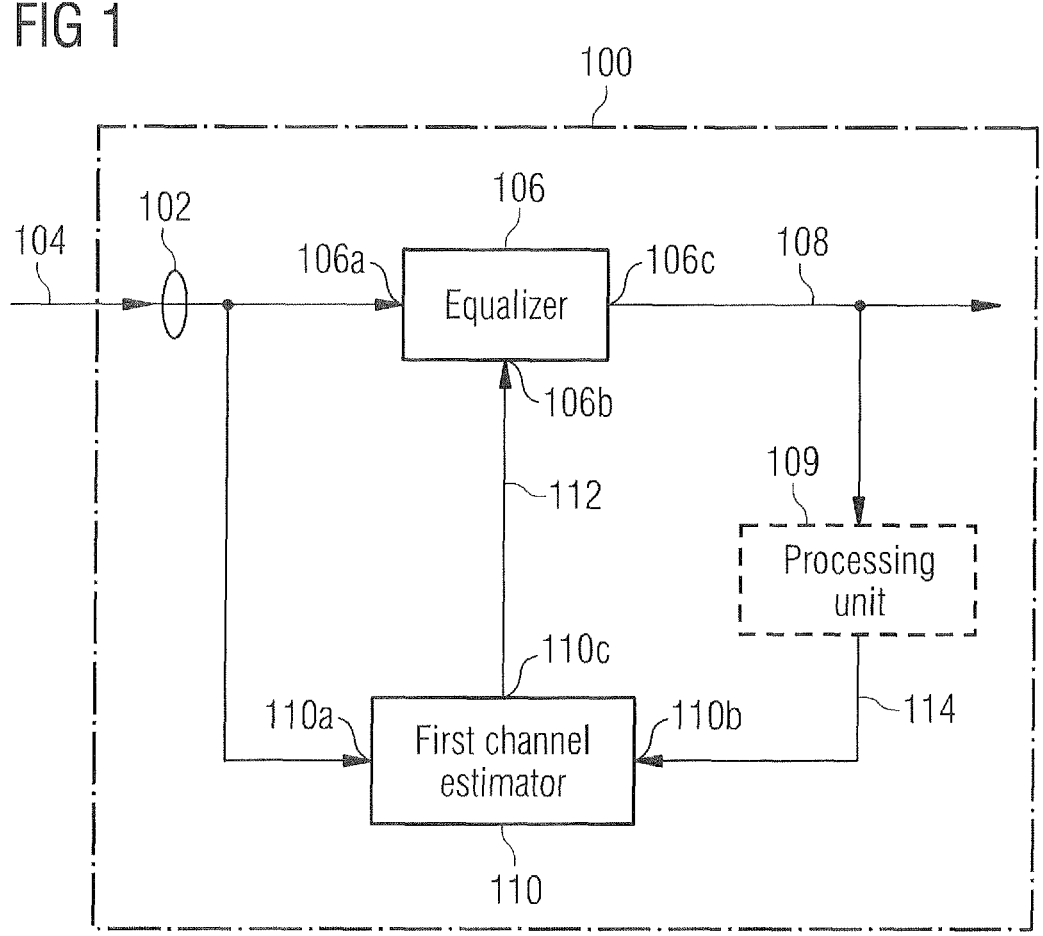
FIG. 1 schematically illustrates a radio receiver according to one embodiment.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

As employed in this Specification, the terms "coupled" and/or "electrically coupled" are not meant to mean that the elements must be directly coupled together; intervening elements may be provided between the "coupled" or "electrically coupled" elements.

Radio receivers including equalizers and channel estimators for receiving radio signals are described below. The radio receivers may be designed for implementing the UMTS (Universal Mobile Telecommunications System) standard, e.g. one of the Release 99, 4, 5, 6, 7, 8 and 9 versions of the UMTS standard. The radio receivers may implement a HSPA (High Speed Packet Access) mobile telephony protocol, such as HSDPA (High Speed Downlink Packet Access) and HSUPA (High Speed Uplink Packet Access). The radio receivers may implement the HSPA+ (Evolved HSPA) standard. The radio receivers may be designed to implement the WCDMA (Wideband Code Division Multiple Access) standard. The radio receivers may be designed to implement the LTE (Long Term Evolution) mobile communications standard, the E-UTRAN (Evolved Universal Terrestrial Radio Access Network) standard, the HSOPA (High Speed Orthogonal Frequency Division Multiplex Packet Access) standard or the Super 3G standard defined by 3GPP (Third Generation Partnership Project) standardization organization. Further the radio receivers may be designed to implement the WiMAX (Worldwide Interoperability for Microwave Access) standard or the IEEE (Institute of Electrical and Electronics Engineers) 802.16 standard. The radio receivers described in the following may also be designed to implement other standards and all such variations are contemplated as falling within the scope of the present invention.

The radio receivers may include integrated circuits or passives. The integrated circuits may be manufactured by different technologies and may, for example, be designed as logic integrated circuits, analog integrated circuits, mixed signal integrated circuits, memory circuits or integrated passives.

Radio signals are radio frequency signals which are radiated by a radio transmitter (sender) with a radio frequency (RF) in the range of about 3 Hz to 300 GHz. This range corresponds to the frequency of alternating current electrical signals used to produce and detect radio waves. RF usually refers to oscillations in electrical circuits.

Equalizers are devices THAT OPERATE for the purpose of altering the frequency response characteristics of a system. They may use passive or active electronic components or digital algorithms to influence the frequency characteristics of the system. Radio channels in mobile radio systems are usually multipath fading channels, which cause intersymbol interference (ISI) in the received signal. To remove ISI from the signal, different types of equalizers can be used. Detection algorithms based on trellis search, e.g. MLSE (Maximum-Likelihood Sequence Estimation) or MAP (Maximum A-posteriori Probability), offer a good receiver performance but exhibit a high computational effort. Therefore, approximating algorithms which exhibit reasonable computational complexity, such as Rake, G-Rake, LMMSE (Linear Minimum Mean Squared Error), decorrelator/zero-forcer, SIC/PIC (Successive Interference Cancellation/Parallel Interference Cancellation), sphere-decoders or list-decoders are utilized. These detectors however require knowledge of the channel impulse response or the channel parameters, which can be provided by a channel estimator.

A channel estimator is a device for estimating channel parameters of a transmission channel. Usually the channel estimation is based on a known sequence of bits, also specified as a sequence of pilot symbols, which is unique for a certain transmitter and which is repeated in every transmission burst. Thus the channel estimator is able to estimate the channel impulse response for each burst separately by exploiting the known transmitted bits and the corresponding received samples. Some of the channel estimators described below are able to estimate the channel impulse response by using the received radio signal and a signal derived from an output of the equalizer.

An input terminal of an electrical circuit may be a point at which a conductor from an electrical component, device or network comes to an end and provides a point of connection to the electrical circuit. The input terminal may simply be the end of a wire or it may be fitted with a connector or fastener. In network analysis an input terminal specifies a point at which connections can be made to a network in theory and does not necessarily refer to any real physical object.

FIG. 1 schematically illustrates a radio receiver 100 according to one embodiment. The radio receiver 100 includes an input terminal 102, an equalizer 106 and a first channel estimator 110. The input terminal 102 is configured to receive a first radio signal 104 and is connected to a first input 106a of the equalizer 106 and to a first input 110a of the first channel estimator 110.

The signal received at the first input 106a of the equalizer 106 is the signal to be equalized, i.e. the frequency response of which is to be changed. The equalizer 106 has a second input 106b which is connected to an output 110c of the first channel estimator 110 which provides first channel parameters 112. The first channel parameters 112 are used to change the frequency characteristics of the signal received at the first input 106a of the equalizer 106. The equalizer 106 further has an output 106c to provide an equalized signal 108. The equalized signal 108 may be processed from the first radio signal 104 by performing an equalization operation, e.g. a convolution with the inverse impulse response by using the first channel parameters 112 in one embodiment. The equalization operation may be performed by a MLSE or MAP algorithm or by any other suitable algorithm which is able to reduce the computational complexity of the MLSE or MAP algorithm to a reasonable computational effort, such as e.g. algorithms like Rake, G-Rake, LMMSE, decorrelators, a zero-forcers, SIC/PIC, sphere-decoders or list-decoders.

The first input 110a of the first channel estimator 110 is configured to receive the first radio signal 104. The first channel estimator 110 includes a second input 110b to receive a signal 114 derived from the equalized signal 108. The signal 114 may be obtained by processing the equalized signal 108, e.g. by filtering, amplifying, delaying or performing any other mathematical operation. The signal 114 may also be a combination of the equalized signal 108 or the processed equalized signal 108 with another signal. The processing of the equalized signal 108 is illustrated by a dotted block processing unit 109 in FIG. 1. The first channel estimator 110 is configured to estimate the first channel parameters 112 by using the first radio signal 104 received at the first input 110a and by using the signal 114 derived from the equalized signal 108 received at the second input 110b and to provide the first channel parameters 112 at the output 110c.

The channel estimation is based on the first radio signal 104, which is to be equalized by the equalizer 106, and the signal 114 derived from the equalized signal 108. In one embodiment, the signal 114 may be a reconstruction of an original first radio signal sent by a radio transmitter via a radio channel. The first channel estimator 110 may be configured to determine a relation between the first radio signal 104 and the signal 114 derived from the equalized signal 108, e.g. by a convolution or filtering operation, to provide the first channel parameters 112.

The original first radio signal, i.e. the signal transmitted by the radio transmitter, may have a certain signal structure which is known to the radio receiver 100. The information on the structure may be exploited by the radio receiver 100 to derive the signal 114 in such a way that the signal 114 approximates the signal structure of the original first radio signal. The first channel estimator 110 may perform a mathematical operation to map the structure of the first input signal 104, the structure of which is distorted by the radio channel, to the signal 114 derived from the equalized signal 108 resulting in the first channel parameters 112.

The original first radio signal may, for example, include a sequence of payload data words, wherein a first payload data word and a successive second payload data word contain the same payload data. Only the information that two successive payload data words including the same payload data are transmitted by the radio transmitter may be known to the radio receiver 100. The radio receiver 100 may have no knowledge of the payload data. The original first radio signal is transmitted by the radio transmitter through the radio channel to the radio receiver 100.

In a first step the radio receiver 100 receives the first payload data word of the first radio signal 104. The radio receiver 100 extracts the payload of the first payload data word from the equalized signal 108 and reconstructs the signal 114 derived from the equalized signal 108.

In a second step the first channel estimator 110 uses the signal 114 as a reconstruction of the first payload data word of the original first radio signal. The first channel estimator 110 uses the signal 114 together with the second payload data word of the first radio signal 104 to estimate the impulse response between the reconstructed original first radio signal and the first radio signal 104. The estimated impulse response corresponds to the first channel parameters 112 which are transferred to the equalizer 106.

Instead of the first and second payload data words having the same payload, a different relationship between the first and second payload data words may be exploited, for example both data words may include redundant versions of the payload. Furthermore, instead of transmitting the first and second payload data words directly one after the other, other payload data words may be transmitted between the transmission of the first payload data word and the transmission of the second payload data word according to an alternative embodiment.

The radio receiver 100 does not require known patterns, e.g. preambles, midambles or pilot data symbols, in the payload data words. The first radio signal 104 may be a user data signal (also known as payload data signal). The equalized signal 108 is based on the first radio signal 104. Further processing blocks may follow the equalizer 106 to extract payload data symbols from the equalized signal 108.

Figure 2:
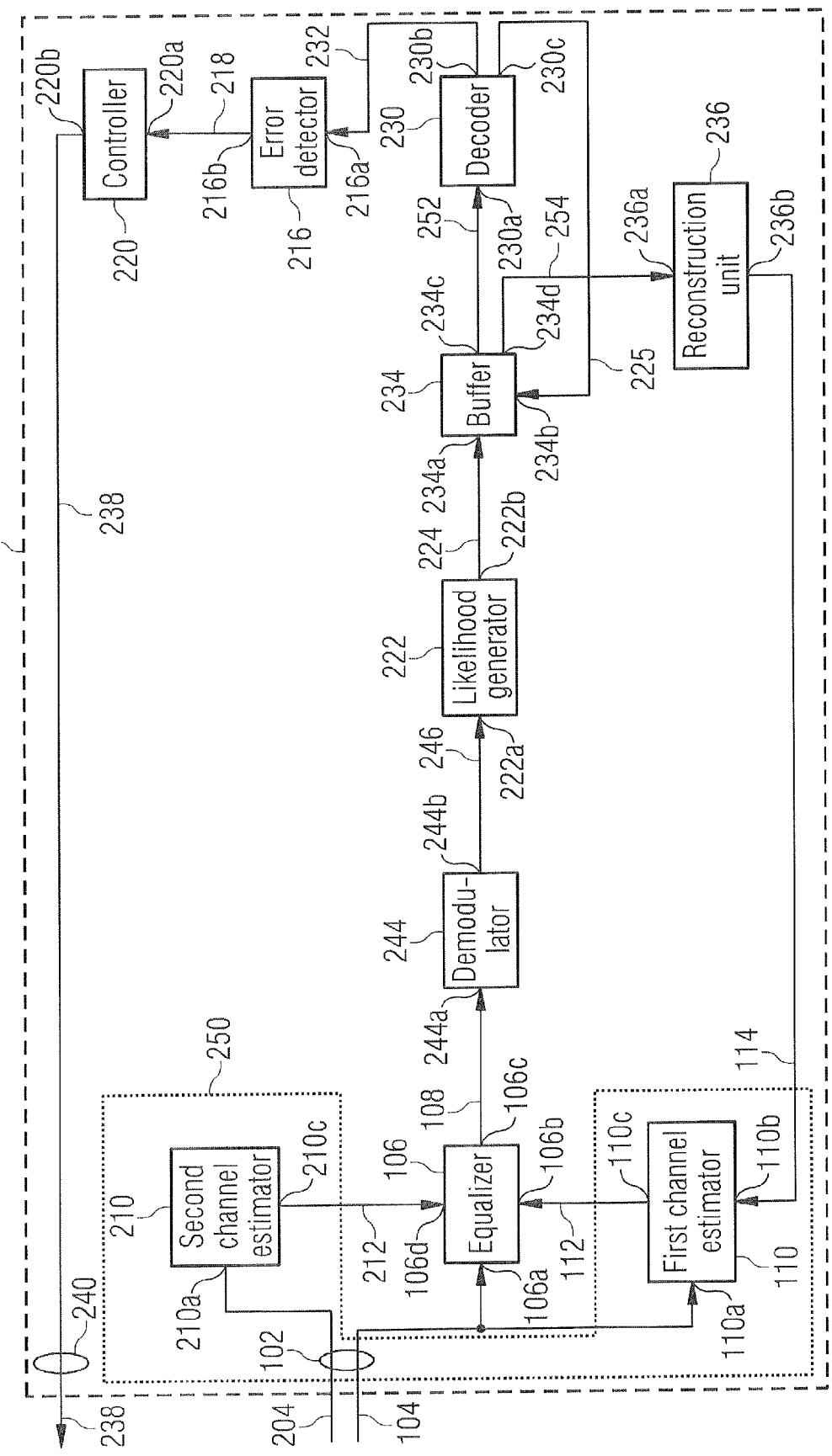
FIG. 2 schematically illustrates a radio receiver according to one embodiment.

FIG. 2 schematically illustrates a radio receiver 200 according to one embodiment. The radio receiver 200 includes an input terminal 102, an equalizer 106, a first channel estimator 110 and a second channel estimator 210. The input terminal 102 is configured to receive a first radio signal 104 and a second radio signal 204 from an antenna and is connected to a first input 106a of the equalizer 106, a first input 110a of the first channel estimator 110 and a first input 210a of the second channel estimator 210.

The first input 106a of the equalizer 106 is the input which receives the signal to be equalized, i.e. the signal the frequency response of which is to be changed. This first input 106a is configured to receive the first radio signal 104. The equalizer 106 has a second input 106b which is connected to an output 110c of the first channel estimator 110 which provides first channel parameters 112. The equalizer 106 has a third input 106d which is connected to an output 210c of the second channel estimator 210 which provides second channel parameters 212. The channel impulse response or the channel parameters received at the second input 106b or the third input 106d are used to change the frequency characteristics of the signal provided at the first input 106a, i.e. the first radio signal 104.

The equalizer 106 further includes an output 106c to provide an equalized signal 108. The equalized signal 108 is generated by performing an equalization operation of the first radio signal 104. The equalization operation may, for example, comprise a convolution of the first radio signal 104 with the inverse impulse response by using the first channel parameters 112 or the second channel parameters 212. The equalization operation may be implemented by a MLSE or MAP algorithm or by any other suitable algorithm which is able to reduce the computational complexity of the MLSE or MAP algorithm to a reasonable computational effort, such as e.g. algorithms like Rake, G-Rake, LMMSE, decorrelators, a zero-forcers, SIC/PIC, sphere-decoders or list-decoders.

The first channel estimator 110 of the radio receiver 200, in one embodiment, is identical to the first channel estimator 110 of the radio receiver 100 illustrated in FIG. 1. The first input 110a of the first channel estimator 110 is configured to receive the first radio signal 104.

The first input 210a of the second channel estimator 210 is configured to receive the second radio signal 204. The second channel estimator 210 is configured to estimate the second channel parameters 212 by using the second radio signal 204 received at the first input 210a. The second radio signal 204 may contain a sequence of known data patterns, e.g. pilot symbols or preambles, which are used for the estimation of the second channel parameters 212 which are provided at the output 210c of the second channel estimator 210.

The radio receiver 200 further includes a demodulator 244, an error detector 216, a controller 220, a likelihood generator 222, a decoder 230, a buffer 234, a reconstruction unit 236 and an output terminal 240.

The output 106c of the equalizer 106 providing the equalized signal 108 is connected to a first input 244a of the demodulator 244 which demodulates the equalized signal 108 and provides demodulated data symbols 246 at an output 244b of the demodulator 244.

The demodulator 244 of a radio receiver 200 according to an embodiment of an HSDPA scheme further contains a despreader, wherein the demodulator 244 demodulates and despreads the equalized signal 108 by using a known spreading code to provide the demodulated data symbols 246. The module 244 is not needed in case of LTE.

The output 244b of the demodulator 244 is connected to an input 222a of the likelihood generator 222. An output 222b of the likelihood generator 222 which provides likelihood information 224 based on the demodulated data symbols 246 is connected to a first input 234a of the buffer 234.

The buffer 234 has a second input 234b to receive decoder-generated likelihood information 225 from the decoder 230. The likelihood information 224 generated by the likelihood generator 222 and the decoder-generated likelihood information 225 received from the decoder 230 may be directly added and stored in the buffer 234. Alternatively, the likelihood information 224 and the decoder-generated likelihood information 225 may be combined in another way, for example a weighted addition, and stored in the buffer 234. The buffer 234 has a first output 234c to provide a first content 252 of the buffer 234 to the decoder 230 and a second output 234d to provide a second content 254 of the buffer 234 to the reconstruction unit 236.

The first input 230a of the decoder 230 is the decoding input receiving the signal to be decoded which corresponds to the first content 252 of the buffer 234. Depending on the first content 252 of the buffer 234 the decoder 230 decodes the demodulated data symbols 246 which are described by the likelihood information stored as first content 252 in the buffer 234 into decoded data symbols 232 which are provided at a first output 230b of the decoder 230. The first output 230b is connected to an input 216a of the error detector 216. A second output 230c of the decoder 230 is connected to the second input 234b of the buffer 234 and provides the decoder-generated likelihood information 225, e.g. extrinsic logarithmic likelihood ratio (LLR) values or a posteriori probability logarithmic likelihood ratio (APP LLR) values, to the buffer 234.

The error detector 216 detects an error in the decoded data symbols 232 by checking the decoded data symbols 232 and provides a detection signal 218 at an output 216b of the error detector 216 if an error is detected. The output 216b of the error detector 216 is connected to an input 220a of a controller 220.

The controller 220 has an output 220b which is connected to an output terminal 240 of the radio receiver 200 to transmit a retransmission request signal 238. The controller 220 is configured to generate the retransmission request signal 238 in response to receiving the detection signal 218 indicating an error in the decoded data symbols 232.

The second output 234d of the buffer 234 is connected to an input 236a of the reconstruction unit 236 to provide the second content 254 of the buffer 234 to the reconstruction unit 236. An output 236b of the reconstruction unit 236 is connected to the second input 110b of the first channel estimator 110. The second input 110b receives the signal 114 derived from the equalized signal 108 via the reconstruction unit 236.

The first radio signal 104 contains payload data symbols and the second radio signal 204 contains pilot symbols. Pilot signals are special reference signals, for example of a single frequency, which are transmitted by a radio transmitter over a communications system, e.g. a radio channel, for supervisory, control, equalization, continuity, synchronization and/or reference purposes. Pilot symbols are special reference symbols known to the receiver which are inserted in a data signal transmitted over a communications system or which are inserted in a pilot signal transmitted together with a data signal over a communications system. A receiver receiving the data signal including the pilot symbols or receiving the pilot signal may reconstruct channel parameters of the communications system for equalizing the data signal using the pilot symbols. In the context of UMTS Release 99 and HSDPA pilot symbols are different from synchronization signals since both information is sent via two separate parallel channels. In the context of UMTS-LTE pilot and synchronization signals are the same, e.g. reference symbols are also used for frequency and/or timing synchronization.

The second channel estimator 210 receives the second radio signal 204 which contains the pilot symbols. Based on the known pattern of the pilot symbols the second channel estimator 210 performs a channel estimation of the radio channel which is the communications channel between the radio transmitter transmitting the second radio signal 204 and the radio receiver 200 receiving the second radio signal 204. The second channel estimator 210 may, for example, implement Least Squares (LS), Wiener filtering or interpolation based channel estimation techniques to estimate the channel parameters of the communications channel. Alternatively Fourier transform-based techniques may be used to estimate the channel parameters of the communications channel in the frequency domain. The resulting channel parameters are provided by the second channel estimator 210 as the second channel parameters 212 at the output 210c.

The second channel estimator 210 may include a correlator to correlate the second radio signal 204 and a signal based on the known pattern of the pilot symbols to determine the second channel parameters 212.

The first channel estimator 110 receives the first radio signal 104 which contains a sequence of data words, and the data words contain payload data symbols. The payload data symbols bear the user information which is detected by the radio receiver 200 and which can be displayed or read by a user of the communications system. The payload data symbols of the sequence of data words may be ordered according to a special rule. This special rule can be a predefined redundancy scheme or redundancy version which is illustrated in FIGS. 4a and 4b.

Applying error control for data transmission or forward error correction (FEC) allows the radio receiver 200 to detect and correct errors within some bound without the need to ask the sender for additional data. Retransmission of data can often be avoided, at the cost of higher bandwidth requirements on average. FEC is accomplished by adding redundancy to the transmitted information using a predetermined algorithm. Each redundant bit is invariably a complex function of many original information bits. The original information may or may not appear in the encoded output. Codes that include the unmodified input in the output are systematic, while those that do not are nonsystematic.

FIGS. 4a and 4b schematically illustrate a redundancy version scheme of a radio signal according to one embodiment. FIG. 4a illustrates the redundancy version scheme according to one embodiment of an HSDPA scheme, and FIG. 4b illustrates the redundancy version scheme according to one embodiment of an LTE scheme. The first radio signal 104 contains a sequence of data words, wherein payload data symbols of the data words are ordered in redundancy versions. FIGS. 4a and 4b depict four data words 401, 402, 403, 404 ordered in different redundancy versions. The original information SYS may be mapped to first redundant information R1 and second redundant information R2 by a complex function known to the radio receiver 200. First redundant information R1 may contain a first part R1A, a second part R1B, a third part R1C and a fourth part R1D. Second redundant information R2 may contain a first part R2A, a second part R2B, a third part R2C and a fourth part R2D. The original information SYS may contain a first part SYSA, a second part SYSB, a third part SYSC and a fourth part SYSD.

FIG. 4a illustrates one embodiment of the redundancy version according to an HSDPA scheme A. First data word 401 ordered in a first redundancy version 0 contains the full original information SYS (SYSA, SYSB, SYSC and SYSD), the first part R1A of the first redundant information R1 and the first part R2A of the second redundant information R2. The first data word 401 ordered in the first redundancy version 0 is formed during a first (original) transmission. A second data word 402 ordered in a second redundancy version I contains the first part SYSA of the original information SYS, the second part R1B of the first redundant information R1 and the second part R2B of the second redundant information R2. The second data word 402 ordered in the second redundancy version I is formed during a first retransmission. A third data word 403 ordered in a third redundancy version II contains the second part SYSB of the original information SYS, the third part R1C of the first redundant information R1 and the third part R2C of the second redundant information R2. The third data word 403 ordered in the third redundancy version II is formed during a second retransmission. A fourth data word 404 ordered in a fourth redundancy version III contains the third part SYSC of the original information SYS, the fourth part R1D of the first redundant information R1 and the fourth part R2D of the second redundant information R2. The fourth data word 404 ordered in the fourth redundancy version III is formed during a third retransmission.

For each of the data words 401-404 both parts (R1A and R2A, R1B and R2B, R1C and R2C, R1D and R2D) of the first redundant information R1 and the second redundant information R2 have nearly or about the same length. When forming the data words 401-404 available bits are first filled with respective parts of the redundant information R1, R2 and afterwards free bits are filled with the respective part of the original information SYS. Depending on a retransmission being successful or unsuccessful more retransmissions may be needed which are performed by using further data words ordered in further redundancy versions. The number of redundancy versions (RV) in HSDPA is 8. However, the base-station is not limited in initiating even more retransmissions.

FIG. 4b illustrates one embodiment of the redundancy version according to an LTE scheme A. First data word 401 ordered in a first redundancy version 0 contains the second SYSB, third SYSC and fourth SYSD parts of the original information SYS, the first part R1A of the first redundant information R1 and the first part R2A of the second redundant information R2. The first data word 401 ordered in the first redundancy version 0 is formed during a first (original) transmission. A second data word 402 ordered in a second redundancy version I contains the first part SYSA of the original information SYS, the second part R1B of the first redundant information R1 and the second part R2B of the second redundant information R2. The second data word 402 ordered in the second redundancy version I is formed during a first retransmission. A third data word 403 ordered in a third redundancy version II contains the second part SYSB of the original information SYS, the third part R1C of the first redundant information R1 and the third part R2C of the second redundant information R2. The third data word 403 ordered in the third redundancy version II is formed during a second retransmission. A fourth data word 404 ordered in a fourth redundancy version III contains the third part SYSC of the original information SYS, the fourth part R1D of the first redundant information R1 and the fourth part R2D of the second redundant information R2. The fourth data word 404 ordered in the fourth redundancy version III is formed during a third retransmission. Depending on a retransmission being successful or unsuccessful more retransmissions may be needed which are performed by using further data words ordered in further redundancy versions. The number of redundancy versions (RV) in LTE is 4. However, the base-station is not limited in initiating even more retransmissions.

A total codeword CW_total contains the original information SYS (or the systematic part SYS), the first redundant information R1 (or the first parity part R1), and the second redundant information R2 (or the second parity part R1). Each of the systematic part SYS, the first parity part R1 and the second parity part R2 may contain N bits. A transmitted codeword CW_trans, e.g. one of the data words 401-404, may contain x bits of the 3N bits of the total codeword CW_total, wherein x is in the range from N to 3N.

The radio receiver 200 may implement one of "Chase combining" and "Incremental combining". When using "Chase combining" the total codeword CW_total of a retransmitted data word is equal to the total codeword CW_total of the originally transmitted data word. When using "Incremental combining" different variants 401-404 of the total codeword CW_total are chosen for retransmission.

The data words 401-404 may be coded by block coding or convolutional coding. Block codes work on fixed-size blocks (packets) of bits or symbols of predetermined size. Convolutional codes work on bit or symbol streams of arbitrary length. Block coding may, for example, be Reed-Solomon coding, Golay, BCH (Bose-Chaudhuri-Hocquenghem), multidimensional parity or Hamming coding. Block and convolutional codes may be combined in concatenated coding schemes for coding the data words 401-404.

Further embodiments for coding the data words 401-404 may use low-density parity-check (LDPC) codes, convolutional codes or turbo codes. LDPC codes are a class of linear block codes. Their parity check matrices contain only a few 1's in comparison to the number of 0's. One of their advantages is that they provide a performance which is very close to the capacity for a lot of different channels and linear time complexity algorithms for decoding. Turbo coding is a scheme that combines two or more relatively simple convolutional codes and an interleaver to produce a block code that can closely approach the channel capacity (within a fraction of a decibel of the Shannon limit).

Based on the special rule in which the payload data symbols are ordered in the sequence of data words of the first radio signal 104 and on the signal 114 derived from the equalized signal 108, the first channel estimator 110 performs a channel estimation by exploiting the special rule to derive the first channel parameters 112. The first channel estimator 110 may, for example, implement Least Squares (LS), Wiener filtering or interpolation based channel estimation techniques to estimate the channel parameters of the communications channel. Alternatively Fourier transform-based techniques may be used to estimate the channel parameters in the frequency domain. The resulting channel parameters are provided by the first channel estimator 110 as first channel parameters 112 at the output 110c of the first channel estimator 110.

The first channel estimator 110 may include a correlator to correlate the first radio signal 104 and the signal 114 derived from the equalized signal 108 to determine the first channel parameters 112.

The received signal, referred to as y, which is received at the input terminal 102 results from a superposition of the first radio signal 104 and the second radio signal 204. The original signal, referred to as x, transmitted by the radio transmitter through the radio channel, referred to as h, is received at the input terminal 102 as the received signal y. The original signal x is specified having two orthonormal signal components $s_p$ and $s_d$, wherein $s_p$ is the signal component comprising the pilot symbols and $s_d$ is the signal component comprising the payload data symbols.

The received signal y can be written as $$y = h \cdot x + v, \qquad (1)$$

wherein v describes the channel noise component which influences the received signal y. By replacing the original signal x as a sum of the two orthonormal signal components $s_p$ and $s_d$, (1) can be rewritten as $$y = h \cdot s_p + h \cdot s_d + v. \qquad (2)$$

Multiplying (2) by the complex conjugate of signal component $s_p$ containing the pilot symbols results in $$y s_p^* = h \cdot s_p s_p^* + h \cdot s_d s_p^* + v s_p^* = h + v s_p^*, \qquad (3)$$

such that the radio channel parameters h can be written as $$h = (y - v) \cdot s_p^*. \qquad (4)$$

Alternatively, multiplying (2) by the complex conjugate of signal component $s_d$ comprising the payload data symbols results in $$y s_d^* = h \cdot s_p s_d^* + h \cdot s_d s_d^* + v s_d^* = h + v s_d^*, \qquad (5)$$

such that the radio channel parameters h can alternatively be written as $$h = (y - v) \cdot s_d^*. \qquad (6)$$

The second channel estimator 210 may estimate the second channel parameters 212 according to equation (4), while the first channel estimator 110 may estimate the first channel parameters 112 according to equation (6). The second channel estimator 210 performs a pilot based channel estimation, and the first channel estimator 110 performs a data based channel estimation.

The first channel estimator 110 and the second channel estimator 210 may be implemented as a joint channel estimator 250 to jointly estimate the first channel parameters 112 and the second channel parameters 212. Such a joint channel estimator 250 may receive a single radio signal including the first radio signal 104 and the second radio signal 204. The first channel parameters may be estimated depending on the second channel parameters and vice versa. The joint channel estimator 250 may be implemented to estimate either the first 112 or the second 212 channel parameters. It may change between estimation of the first 112 and the second 212 channel parameters depending on a predetermined criterion such as a signal-to-noise ratio. Alternatively the joint estimator may estimate the first 112 and the second 212 channel parameters in parallel to be able to perform fast switching between both channel parameters. The joint estimator 250 may also merge both references, i.e. the signal 114 serving as the data reference signal and the known pilot signal, to a joint reference signal and correlate the incoming signal with the joint reference signal. The incoming signal may be the first radio signal 104 and/or the second radio signal 204. The joint estimator may combine information from the pilot-based channel and information from the data-based channel to achieve an optimized channel estimation.

The equalizer 106 may selectively use the second channel parameters 212 or the first channel parameters 112 to equalize the first radio signal 104. A selection may be performed by a switch, for example. The switch may be hardware- or software-implemented. The equalizer 106 may start equalizing the first radio signal 104 by using the second (pilot based) channel parameters 212 and then switch to the first (data based) channel parameters 112. The switching may be dependent on a specific criterion, e.g. a signal-to-noise ratio or a likelihood ratio.

Depending on a second criterion, e.g. a signal-to-noise ratio or a likelihood ratio, the equalizer 106 may switch back to the second (pilot based) channel parameters 112. This may be helpful in case that a signal-to-noise ratio (SNR) or a signal-to-interference-plus-noise-ratio (SINR) drops below a critical value. In such a case it would make sense to switch off the data based estimator (the first channel estimator 110).

The equalizer 106 may also be configured to use both the first 112 and the second 212 channel parameters, simultaneously or alternating, for equalizing the first radio signal 104. The equalizer 106 may determine a combination of the first 112 and the second 212 channel parameters, for example an average value, to improve the reliability of the channel estimation.

The equalizer 106 may include a channel filter which is used for further filtering the first 112 or second 212 channel parameters before the first radio signal 104 is equalized using the filtered first 112 or second 212 channel parameters. The channel filter may be used to compensate a known receiver characteristics, for example, caused by filtering due to analog-to-digital conversion or by demodulation filters in the receiving path.

The equalizer 106 may include a Rake receiver, a G-Rake (Generalized Rake) receiver or an equalizer to counter the effects of multipath fading. This can be achieved by using several sub-equalizers or "fingers", that is, several correlators each assigned to a different multipath component. Each finger independently equalizes a single multipath component, at a later stage the contribution of all fingers are combined in order to make the most use of the different transmission characteristics of each transmission path. This results in a higher signal-to-noise ratio in a multipath environment. The sub-channel parameters of the sub-equalizers may be provided by the first 110 or second 210 channel estimators.

By using the Rake receiver, the G-Rake receiver or the equalizer, different paths with different delays can be effectively combined to obtain the path diversity gain. Due to narrow transmission pulses and a large transmission bandwidth of the radio channel, the resulting inter-symbol interference (ISI) and a long delay spread in the characterization of the radio channel may be overcome by using a rake receiver.

The equalizer may include a combined adaptive Rake/G-Rake and equalizer structure, referred to as an MMSE (minimum mean square error) algorithm to reduce multi-path destruction and ISI instead of a usual maximum ratio combining (MRC) Rake receiver.

The demodulator 244 is configured to demodulate the equalized signal 108 and provide the demodulated data symbols 246 at its output 244b. The demodulator 244 may demodulate a complex-valued equalized signal 108, i.e. to recover the information content from the modulated equalized signal 108. The demodulator 244 may detect the amplitudes of in-phase and quadrature components of an equalized signal 108 shifted to baseband or the phase or the frequency of an equalized signal 108 shifted to an intermediate frequency. The demodulator 244 may further map the quantized amplitudes, phases or frequencies to codewords or demodulated data symbols. The codewords may be parallel-to-serial converted into a bit stream provided at the output 244b of the demodulator 244. The demodulator 244 may, for example, perform a 16 QAM, 64 QAM or higher modulation scheme or a QPSK or any PSK modulation scheme.

The likelihood generator 222 is configured to generate likelihood information based on the demodulated data symbols 246. The likelihood information may be bit-based such that for individual bits b={+1,−1} of the demodulated data symbols 246 likelihood information may be determined according to the following equation:

$$\lambda = \log(p[b=+1]/p[b=-1]) = \log(p/(1-p)), \quad (7)$$

wherein $p[b=+1]=p$ is the probability of interpreting an individual data bit b as +1 and $p[b=-1]=1-p$ is the probability of interpreting an individual data bit b as −1. The likelihood information $\lambda$ is denoted as the logarithm of the likelihood ratio (LLR). The absolute values of the likelihood information of different individual bits of a detected data symbol may be added to provide a reliability information sum.

The decoder 230 is configured to provide the decoded data symbols 232 by decoding the likelihood information describing the demodulated data symbols 246 stored in the buffer 234. The decoder 230 may be, for example, a turbo decoder or a low-density parity-check (LDPC) decoder.

Figure 6:
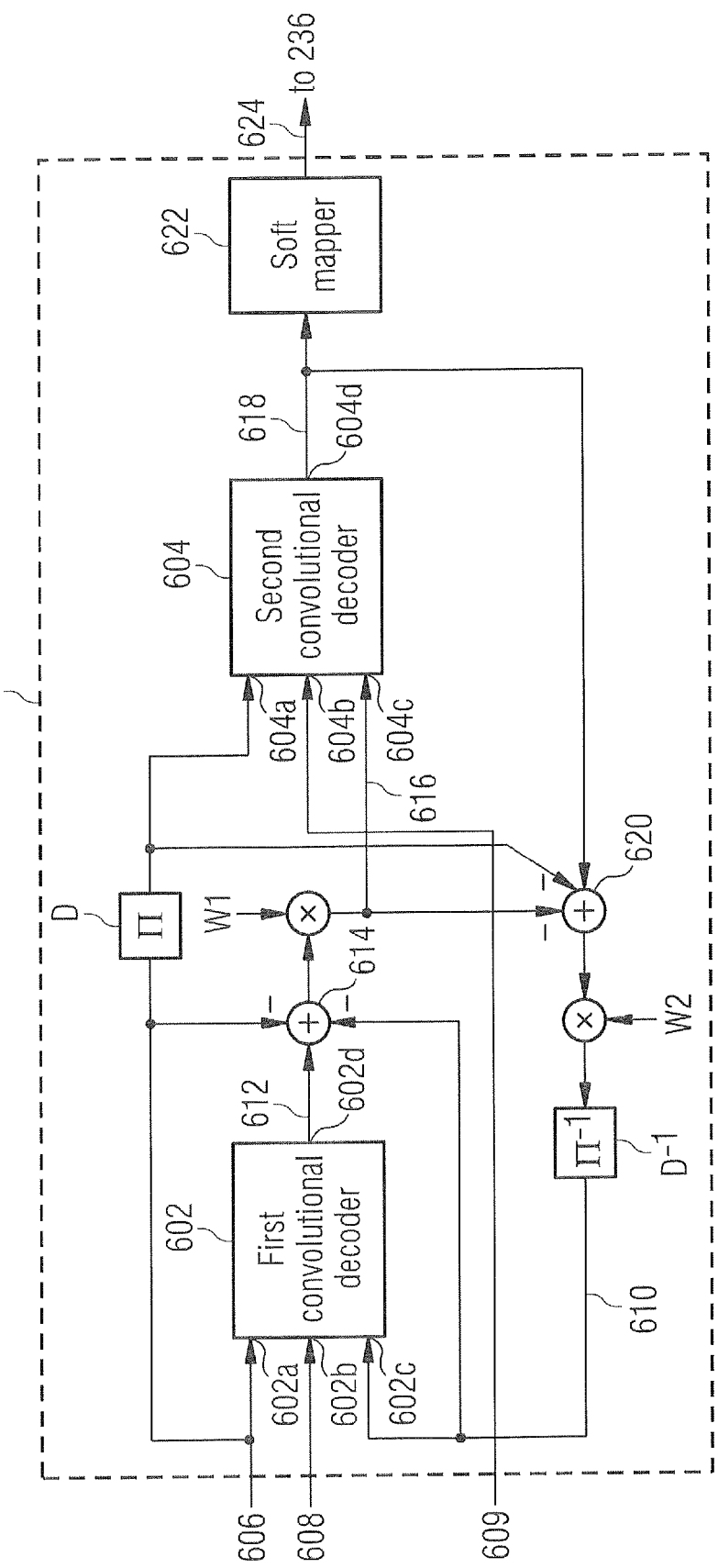
FIG. 6 shows a block diagram schematically illustrating a structure of a turbo decoder according to one embodiment.

FIG. 6 schematically illustrates a block diagram of a turbo decoder 600 according to an embodiment. The turbo decoder 600 may correspond to the decoder 230 depicted in FIG. 2. The turbo decoder 600 includes a first convolutional decoder 602 and a second convolutional decoder 604, both of which work on the same block of information bits including systematic information 606, first parity (redundant) information 608 and second parity (redundant) information 609. The first parity information 608 may correspond to the first redundant information R1 depicted in FIGS. 4a and 4b. The second parity information 609 may correspond to the second redundant information R2 depicted in FIGS. 4a and 4b. The first convolutional decoder 602 receives the systematic information 606 at a first input 602a, the first parity information 608 at a second input 602b and first extrinsic LLR (logarithmic likelihood ratio) information 610 at a third input 602c. The first convolutional decoder 602 provides first APP (a posteriori probability) LLR (logarithmic likelihood ratio) information 612 at an output 602d of the first convolutional decoder 602. A first adder 614 adds the inverse systematic information 606, the inverse first extrinsic LLR information 610 and the first APP LLR information 612 to provide first added information which is multiplied by a first weighting factor $w_1$ obtaining second extrinsic LLR information 616 which is received at a third input 604c of the second convolutional decoder 604. A first input 604a of the second convolutional decoder 604 receives the systematic information 606 interleaved by an interleaver Π. A second input 604b of the second convolutional decoder 604 receives the second parity information 609. The second convolutional decoder 604 provides second APP LLR information 618 at an output 604d of the second convolutional decoder 604. A second adder 620 adds the systematic information 606 being interleaved by the interleaver Π and inverted, the inverse second extrinsic LLR information 616 and the second APP LLR information 618 to provide second added information which is multiplied by a second weighting factor $w_2$ and deinterleaved by a deinterleaver $\Pi^{-1}$ obtaining the first extrinsic LLR information 610 which is received at the third input 602c of the first convolutional decoder 602.

Optionally a soft mapper 622 performs a soft mapping operation on the second APP LLR information 618 to provide soft-coded output information 624 at an output of the turbo decoder 600. The mapping of the soft mapper 622 may depend on a redundancy version (RV) in which the codeword containing the systematic information 606 and the parity (redundant) information 608, 609 is coded. Alternatively the second APP LLR information 618 may be provided at the output of the decoder 600 as hard-coded output information. In order to avoid any potential gaps, the APP output could also be taken from 612 instead of 618.

Decoding of the turbo decoder 600 is an iterative process with the exchange of reliability information. In every iteration each convolutional decoder 602, 604 calculates for every received bit a LLR (log-likelihood ratio) as a soft-output (reliability information). The soft output of each convolutional decoder 602, 604 is modified to reflect only its own confidence in the received information bit. The sign of each LLR indicates the received information bit of being sent either as "−1" or "+1", the absolute values are measures of confidence in the respective −1/+1 decision. The convolutional decoders 602, 604 may be maximum a posteriori (MAP) decoders. A typical implementation of the MAP convolutional decoder is the BCJR decoder.

According to one embodiment the buffer 234 is located at the input of the decoder 230. The likelihood information 224 may be generated by the likelihood generator 222 as LLR (logarithmic likelihood ratio) values which may be directly added to the LLR values which are already stored in a first memory (first content 252) of the buffer 234 in case of retransmissions. In case of a first transmission the corresponding first memory (first content 252) of the buffer 234 is preset to zero such that the LLR values provided by the likelihood generator 222 are directly stored in the first memory (first content 252) of the buffer 234. Then the first memory (first content 252) of the buffer 234 is input to the decoder 230. The first content 252 of the buffer 234 may contain a systematic part memory, a first parity part memory and a second parity part memory to store the LLR values according to their position in the received data word 401-404 as depicted in FIGS. 4a and 4b. LLR values corresponding to the systematic part SYS of a received data word may be stored in the systematic part memory, LLR values corresponding to first redundant part R1 and second redundant part R2 may be stored in the first and second parity part memories, respectively, of the first content 252 of the buffer 234.

According to one embodiment the first and second extrinsic LLR information 610, 616 may be generated by the decoder 230 as first and second extrinsic LLR (logarithmic likelihood ratio) values which may be stored in a second memory (second content 254) of the buffer 234. These extrinsic LLR values are saved in the second content 254 of the buffer 234 after decoding was not successful. This second content 254 of the buffer 234 is received at the input of the reconstruction unit 236 such that from the extrinsic LLR values 610, 616 the codeword 114 is reconstructed.

According to one embodiment the first and second APP LLR information 612, 618 may be generated by the decoder 230 as first and second APP LLR values which may be stored in a second memory (second content 254) of the buffer 234. These APP LLR values are saved in the second content 254 of the buffer 234 after decoding was not successful. This second content 254 of the buffer 234 is received at the input of the reconstruction unit 236 such that from the APP LLR values 612, 618 the codeword 114 is reconstructed.

According to one embodiment the soft-coded output information 624 at the output of the turbo decoder 600 is saved in the second content 254 of the buffer 234 after decoding was not successful. This second content 254 of the buffer 234 is received at the input of the reconstruction unit 236 such that from the soft-coded output information 624 the codeword 114 is reconstructed.

According to one embodiment the first and second APP LLR values 612, 618 may be stored in a second memory (second content 254) and the first and second extrinsic LLR values 610, 616 may be stored in a third memory of the buffer 234 after decoding was not successful. The reconstruction unit 236 may be configured to receive the first and second APP LLR values 612, 618 and the first and second extrinsic LLR values 610, 616 stored in the buffer 234 to reconstruct the codeword 114 by the combined information of APP LLR values 612, 618 and extrinsic LLR values 610, 616.

According to one embodiment the soft-coded output information 624, the first and second extrinsic LLR information 610, 616 and/or the first and second APP LLR information 612, 618 are directly received at the input of the reconstruction unit 236 such that the reconstruction unit 236 reconstructs the codeword 114 from one of, or a combination of, one of the soft-coded output information 624, the first and second extrinsic LLR information 610, 616 and the first and second APP LLR information 612, 618.

The error detector 216 is configured to detect an error in the decoded data symbols 232 and provide the detection signal 218 indicating the error. The error detection may, for example, be performed by applying a cyclic redundancy check (CRC). The cyclic redundancy check considers a block of data as the coefficients to a polynomial and then divides the coefficients by a fixed, predetermined polynomial. The coefficients of the result of the division are taken as the redundant bits, the CRC. The error detector 216 at reception side can recompute the CRC from the payload bits and compare this with the CRC that was received. A mismatch indicates that an error occurred.

Alternatively, the error detection may be performed by applying a checksum calculation, a parity bit calculation, a Hamming distance calculation or by calculating a hash function or other appropriate error detection techniques. The error detection may perform horizontal, vertical or diagonal redundancy checks.

The controller 220 is configured to request retransmission of a data word from the sequence of data words of the first radio signal 104 if the detection signal 218 provided by the error detector 216 indicates an error in the respective data word. The controller 220 may be configured to request retransmission of a first data word 401 of the sequence of data words of the first radio signal 104 which is ordered in the first redundancy version I (see FIGS. 4a and 4b) as a second data word 402 of the sequence of data words of the first radio signal 104 which is ordered in the second redundancy version II. The controller 220 may transmit the retransmission request signal 238 via the output terminal 240 of the radio receiver 200 to the radio transmitter of the communications system which may initiate retransmission.

The controller may implement a HARQ (Hybrid Automatic Repeat Request) protocol or a standard ARQ (Automatic Repeat Request) protocol. In standard ARQ, error-detection information (ED) bits are added to data to be transmitted (e.g. cyclic redundancy check, CRC). In HARQ, forward error correction (FEC) bits are additionally added to the Error Detection (ED) bits (e.g. Reed-Solomon code or Turbo code). As a result HARQ performs better than ordinary ARQ in poor signal conditions, but in its simplest form this comes at the expense of significantly lower throughput in good signal conditions.

The simplest version of HARQ is type I HARQ which adds both ED and FEC information to each message prior to transmission. When the coded data block is received, the radio receiver first decodes the error-correction code. If the channel quality is good enough, all transmission errors should be correctable, and the radio receiver can obtain the correct data block. If the channel quality is bad, and not all transmission errors can be corrected, the radio receiver will detect this situation using the error-detection code, then the received coded data block is discarded and a retransmission is requested by the radio receiver. The controller 220 may implement a type I HARQ protocol.

Type II HARQ, a more sophisticated form, transmits only ED bits or only FEC information and ED bits on a given transmission. As error detection (ED) usually only adds a couple of bytes to a message, which is only an incremental increase in length, FEC, on the other hand, can often double or triple the message length with error correction parities. In terms of throughput, standard ARQ typically expends a few percent of channel capacity for reliable protection against error, while FEC ordinarily expends half or more of all channel capacity for channel improvement. Type II HARQ does not suffer the capacity loss in strong signal condition, because FEC bits are only transmitted on subsequent retransmissions as needed. In strong signal conditions type II HARQ performs with as good capacity as standard ARQ. In poor signal conditions type II HARQ performs with as good sensitivity as standard FEC.

While it is possible that independently decoded, two given transmissions are not possible to decode error-free, it may happen that the combination of all the previously erroneously received transmissions gives enough information to correctly decode. There are two alternatives of re-combining in HARQ. The first alternative is "Chase combining", wherein every retransmission contains the same information of data and parity bits. Every retransmission adds extra power to the received transmission. The second alternative is "Incremental Redundancy", wherein every retransmission contains different information than the previous one. At every retransmission the receiver gains knowledge of extra information. The controller 220 may perform type II HARQ with "Chase combining" or may perform type II HARQ with "Incremental Redundancy".

The controller 220 may implement HARQ in stop-and-wait mode or in selective repeat mode. Stop-and-wait is simpler, but waiting for the receiver's acknowledgement reduces efficiency. Thus multiple stop-and-wait HARQ processes may be implemented in parallel or nearly parallel by the controller 220. When one HARQ process is waiting for an acknowledgement, another process can use the channel to send some more data.

In FIG. 7 a block diagram schematically illustrates a transmission sequence of data words of a first radio signal 104 according to an embodiment. A radio transmitter TX sends a sequence of data words HARQ1, HARQ2, HARQ3, HARQ4, HARQ5, HARQ6 which are transmitted through a radio channel (indicated by the dotted arrows). The data included in the data words HARQ1, HARQ2, HARQ3, HARQ4, HARQ5, HARQ6 are ordered in the first redundancy version I corresponding to the redundancy version scheme depicted in FIGS. 4a and 4b.

A radio receiver RX corresponding to the radio receiver 200 receives the sequence of data words and detects errors in the data words HARQ1 and HARQ3. The receiver RX requests retransmission of the erroneous data words HARQ1 and HARQ3 by sending the retransmission request signals 238 upon detection of the respective erroneous data words HARQ1 and HARQ3. The radio transmitter TX retransmits the respective erroneous data words HARQ1 and HARQ3 after five further respective data words were transmitted. This corresponds to a number of six independent HARQ processes which may run in parallel. The retransmitted data words HARQ1 and HARQ3 are ordered in a second redundancy version II while a non-erroneous data word HARQ7 subsequent to retransmitted data word HARQ1 is ordered in the first redundancy version I. Data words subsequent to the retransmitted data word HARQ3 (not shown in FIG. 7) will be transmitted in the first redundancy version I. The number of HARQ processes may be a predetermined number or may be negotiated by the HARQ protocol.

The redundancy version scheme may be implemented in the radio receiver 200 such that the retransmission request signal 238 includes a requested redundancy version of a retransmitted data word. In one embodiment, the redundancy version scheme may be implemented in the radio transmitter TX such that the retransmission request signal 238 does not include a requested redundancy version information as this is decided by the radio transmitter TX. The radio transmitter TX either informs the radio receiver RX about the used redundancy version, or the radio transmitter TX chooses the redundancy version according to a redundancy scheme which is known by the radio receiver RX.

The controller 220 may contain a HARQ protocol within a HSDPA or HSUPA standard which provides high speed data transmission on downlink and uplink, respectively, for mobile phone networks such as UMTS and the IEEE 802.16e standard for mobile broadband wireless access, also known as "mobile access WiMAX". The controller 220 may also contain a HARQ protocol within a fixed access network, for example "fixed access WiMAX" according to the IEEE 802.16d standard. The controller 220 may also contain a HARQ protocol within a 3GPP Long Term Evolution (LTE) framework. The controller 220 may be implemented in hardware or in software.

Data words of the sequence of data words of the first radio signal 104, which are processed by a HARQ process, are stored in the buffer 234. When the error detector 216 indicates an error by sending the detection signal 218 to the controller 220, the received data word indicated as erroneous is stored in the buffer 234.

The buffer 234 may contain multiple buffer units to store multiple erroneous data words of a sequence of data words to allow continuous transmission of data words without the need to wait for an acknowledgement of the receiver after transmission of each data word in the sender. The buffer 234 is configured to implement the transmission sequence of data words as depicted in FIG. 7 corresponding to the redundancy version scheme depicted in FIGS. 4a and 4b.

The buffer 234 is further configured to store the likelihood information 224 provided by the likelihood generator 222. The likelihood generator 222 is configured to generate first likelihood information 224 based on demodulated data symbols 246 of a first data word 401 of the sequence of data words which first data word 401 is ordered in a first redundancy version 0. The likelihood generator 222 is further configured to generate second likelihood information 225 based on demodulated data symbols 246 of a second data word 402 of the sequence of data words which second data word 402 is ordered in a second redundancy version I and which second data word 402 bears the same payload information as the first data word 401. Data words 401, 402, 403, 404 bearing the same payload information but being ordered in different redundancy versions are depicted in FIGS. 4a and 4b.

The buffer 234 may store values describing a combined likelihood information by combining the first likelihood information associated with the first redundancy version 0 stored in the buffer 234 and the second likelihood information associated with the second redundancy version I. The combination is such that the reliability of the combined likelihood information is higher than the reliability of the first likelihood information and higher than the reliability of the second likelihood information.

When the second data word is received after the first data word the first likelihood information may be stored in the buffer 234 (as first content 252) while the second likelihood information is generated by the likelihood generator 222. The combined likelihood information as a combination of first likelihood information stored in the buffer 234 and second likelihood information generated by the likelihood generator 222 may be stored in the buffer 234 by updating the first content 252 of the buffer 234. The combination may be a direct addition of likelihood information 224 generated by the likelihood generator 222 and likelihood information already stored in the buffer 234 (at the first content 252). A second content 254 of the buffer 234 may be used to store decoder-generated likelihood information 225, for example extrinsic LLR values 610, 616, APP LLR values 612, 618 or soft-coded decoder output values 624. In case a transmission is unsuccessful the second content 254 of the buffer 234 may be received at the input of the reconstruction unit 236 to reconstruct the codeword 114.

The reconstruction unit 236 is configured to provide the signal 114 derived from the equalized signal 108. The reconstruction unit 236 performs a symbol reconstruction based on the likelihood information (second content 254) stored in the buffer 234. When a first data word 401 which is ordered in a first redundancy version 0 is erroneous, the first likelihood information is generated by the likelihood generator 222 and stored in the buffer 234. Based on this first likelihood information 224, the reconstruction unit 236 reconstructs the second data word 402, which is ordered in a second redundancy version I, and provides the second data word 402 to the first channel estimator 110. The first channel estimator 110 may use this information to perform (data based) channel estimation based on the provided second data word which represents an estimation of the (original) second data word as being sent by the radio transmitter through the radio channel. The radio transmitter will send the second data word 402 after the first data word 401. This transmission rule, as exemplary indicated in FIGS. 4a and 4b, is known to the radio receiver 200. As soon as the second data word 402 arrives within the sequence of data words of the first radio signal 104 at the radio receiver 200, the first channel estimator 110 may use the first radio signal 104 comprising the actual value of the second data word 402 and perform a channel estimation based on an (estimated) desired value of the second data word 402 provided by the reconstruction unit 236.

When the second data word 402 which is ordered in the second redundancy version I is erroneous, the second likelihood information 224 is generated by the likelihood generator 222 and a combination of the second likelihood information 224 and the likelihood information of the first data word 401 which is already stored in the first content 252 of the buffer 234 is generated. The first content 252 of the buffer 234 is updated by this combined likelihood information. Based on this combined likelihood information the reconstruction unit 236 reconstructs a third data word 403 which is ordered in a third redundancy version II and provides the third data word 403 to the first channel estimator 110. The first channel estimator 110 may use this information to perform (data based) channel estimation based on the provided third data word 403 which represents an estimation of the (original) third data word as being sent by the radio transmitter through the radio channel. The radio transmitter will send the third data word 403 after the second data word 402. As soon as the third data word 402 arrives within the sequence of data words of the first radio signal 104 at the radio receiver 200, the first channel estimator 110 may use the first radio signal 104 containing the actual value of the third data word 403 and perform a channel estimation based on an (estimated) desired value of the third data word 403 provided by the reconstruction unit 236.

The first radio signal 104 including the sequence of data words 401, 402, 403, 404 may be sent by the radio transmitter with a higher power than the second radio signal 204 including the pilot symbols. The first radio signal 104 may be received by the radio receiver 200 when data transmission is activated while the second radio signal 204 may be a permanently active signal in order to hold contact between radio transmitter and radio receiver 200. Therefore the second radio signal 204 may be transmitted using a reduced power compared to the power of the first radio signal 104. The power reduction may be in the range of a factor of 10.

Figure 3:
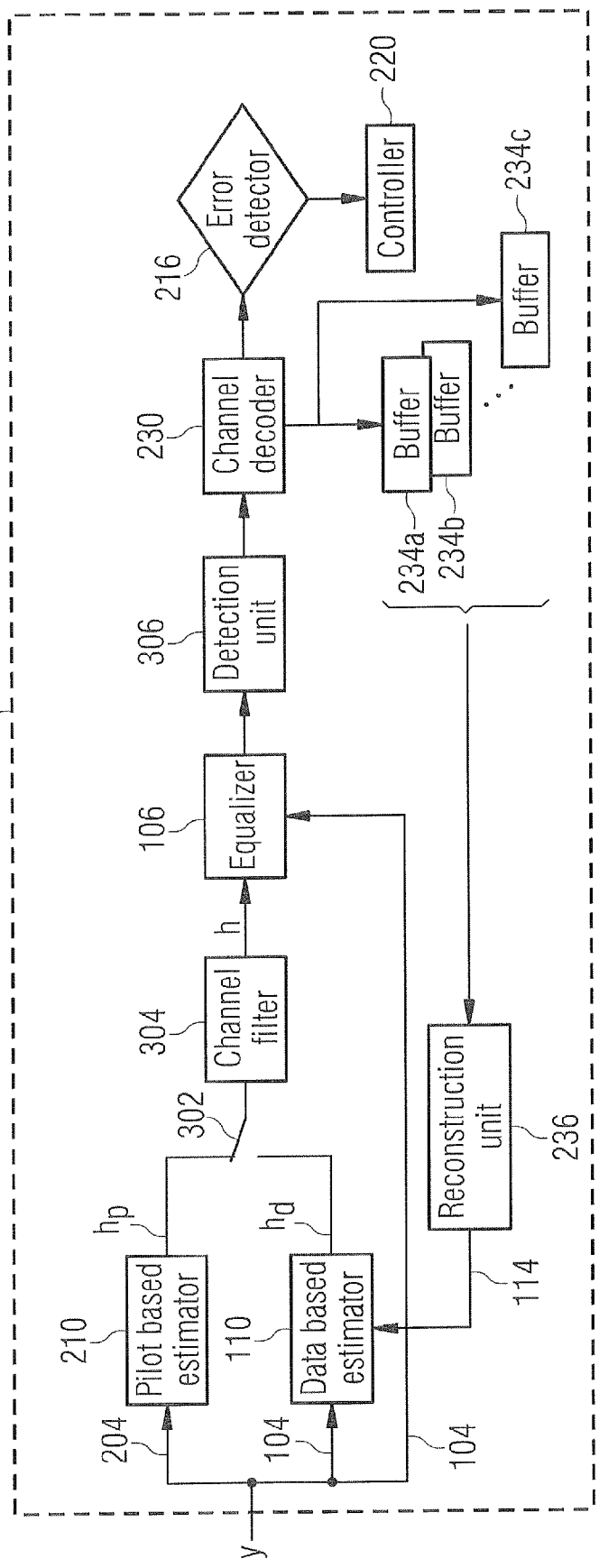
FIG. 3 schematically illustrates a radio receiver according to one embodiment.

FIG. 3 schematically illustrates a radio receiver 300 according to one embodiment. The radio receiver 300 may be applied to a communication system with hybrid automatic repeat request (HARQ) and redundancy version (RV) combining. The radio receiver 300 includes a pilot-based estimator 210 corresponding to the second channel estimator 210 as depicted in FIG. 2. The radio receiver 300 further includes a data-based estimator 110 corresponding to the first channel estimator 110 as depicted in FIG. 2. A receive signal y includes a first radio signal 104 and a second radio signal 204. The pilot-based estimator 210 uses the second radio signal 204 to estimate a pilot-based impulse response $h_p$ corresponding to the second channel parameters 212 as depicted in FIG. 2. The data-based estimator 110 uses the first radio signal 104 to estimate a data-based impulse response $h_d$ corresponding to the first channel parameters 112 as depicted in FIG. 2. Usually, the channel is first identified based on reference pilot symbols, i.e. by the pilot-based estimator 210. In case of an error in data transmission the HARQ protocol is requesting retransmission of an erroneous data word. After a retransmission occurred, the channel is identified based on estimated data symbols corresponding to retransmitted data symbols, i.e. by the data-based estimator 110.

A switch 302 is used to switch the pilot-based impulse response $h_p$ or the data-based impulse response $h_d$ to an input of a channel filter 304 which is configured to further filter the respective impulse response and provide a filtered impulse response to a configuration input of an equalizer 106. The equalizer 106 has a signal input for receiving the first radio signal 104 which is equalized by using the filtered impulse response. The equalizer 106 may include a Rake receiver, G-Rake receiver or an equalizer for performing Rake processing to include multipath signals to the equalized signal output by the equalizer 106. After symbol detection in a detection unit 306 the detected symbols are further used to generate log-likelihood values (LLR) for the individual bits of the detected symbols which bits are fed to a channel decoder 230 corresponding to the decoder 230 as depicted in FIG. 2.

After decoding, an error detection is performed in an error detector 216 corresponding to the error detector 216 as depicted in FIG. 2. The error detection may be a CRC (cyclic redundancy check). In case that the CRC is not successful, the available LLR values are stored in the so called HARQ buffer 234a, 234b, 234c in the radio receiver 300. A retransmission of the same packet with index x is requested by a controller 220 corresponding to the controller 220 depicted in FIG. 2. In a case when this packet is scheduled, the channel estimator (i.e. the data-based channel estimator 110) is using the reconstructed symbols rather than the pilot symbols for channel estimation. This has the advantage that the data channel typically has much higher power than the pilot channel. As long as the major part of the LLRs is correct, the channel estimate can be refined. In case that the SNR drops below a critical value, the data-based estimator 110 may be switched off. The LLRs in the HARQ buffer can either cover all code-bits or just those at the entrance of the channel decoder. In the first case a reconstruction of the data symbols is straightforward, in the second case the missing LLRs can be generated with the help of the known RV (redundancy version) pattern.

The radio receiver 300 exploits information that comes from previous HARQ/RV processes. If a packet could not be decoded correctly in the radio receiver 300, then the radio receiver 300 sends back a signal to the radio transmitter to request the same packet with a different redundancy version (RV). As soon as this packet is received, it will be combined with the LLR values of the first transmission that are stored in the HARQ buffer. In this way decoding is made more effective. LLR values in the HARQ buffer are used as reference symbols for channel estimation.

In a case when a packet arrives for the second time, the channel estimation is carried out on the data-channel rather than on the pilot channel. This solution includes a natural regulation mechanism for enhanced channel estimation that is triggered by the success rate of packet decoding. In the high SNR region there is no need for improved channel estimation, hence this mechanism is never or seldom activated. The reference symbols can be obtained as hard or soft symbols depending on the system SNR. HARQ buffer information is reused for opportunistic channel estimation.

The radio receiver 300 may be applied in UMTS-R99 or higher versions of the standard, in the HSPA standard, in the LTE standard or in any other appropriate standard. In such environments channel estimation is based on a Common Pilot Channel (CPICH). In order to keep the power spent for this task low, i.e. to minimize the overhead, the corresponding power makes up usually $E_{c,CPICH}/I_{or}=1/10$ of the totally transmitted signal power $I_{or}$ of a base station.

The radio receiver 300 may start channel estimation in a mobile terminal or user equipment UE by exploiting the CPICH. The quality of the channel estimation is based on the signal to noise ratio $I_o/I_{oc}$. In scenarios with poor SNR like the cell edge the quality of channel estimation is rather poor. This causes degradations in channel estimation using the pilot-based channel estimation. When such degradations occur the radio receiver 300 switches to the data-based channel estimation performed by the data-based channel estimator 110 which receives a data channel, e.g. a dedicated physical data channel DPDCH, having a higher signal-to-noise ratio than the common pilot channel CPICH.

The data-based channel estimator 110 may also utilize a control channel, e.g. the dedicated physical control channel DPCCH for channel estimation. The DPCCH has also a higher SNR when received at the radio receiver 300 than the CPICH. Data can also be retrieved from other channels like a SCH (synchronization channel), a HS-SCCH (shared control channel), a DPCH (dedicated physical channel) a FACH (forward access channel) or an Enhanced FACH (forward access channel). Like the Enhanced FACH channel in HSDPA also other channels to be used may predefine certain parameters such as the RV scheme, the modulation rate or the coding rate. For Enhanced FACH the modulation is QPSK, the coding is Turbo coding with a coding rate of ⅓ and the redundancy version (RV) scheme is predefined.

In order to check whether the pilot-based channel estimator 210 or the data-based channel estimator 110 is in use, the power of the CPICH in a sender, e.g. a testing Node-B, may be reduced. If the pilot-based channel estimator 210 is active alone, then the detection rate will decrease to a rate in the range of zero. If the rate does not reduce in such a degree, this implies that the data-based channel estimator 110 or both channel estimators 110, 210 are active and data is exploited for channel estimation.

For transmission of the redundancy versions (0, I, II, III, . . . ) a control channel HS-SCCH may be used in HSDPA. This control channel may also be utilized for transmission of a constellation version or modulation mapping, respectively, which is needed by the detection unit 306. The detection unit 306 may implement 16 QAM, 64 QAM or higher versions of QAM.

The reconstruction unit 236 may perform a hard-coded symbol reconstruction based on the detected (quantized) symbol at the output of the detection unit 306 or may perform a soft-coded symbol reconstruction considering both the detected (quantized) symbol at the output of the detection unit 306 and the (log)-likelihood information LLR which may be provided by the detection unit 306.

The buffers 234a, 234b, 234c may be used to implement a HARQ/RV protocol implemented in a HSUPA, WiMAX or LTE standard storing the erroneous data words needed by the HARQ protocol and/or likelihood information. The HARQ/RV protocol may use "Chase Combining" or "Incremental Combining".

The radio receiver 300 may also contain multiple antennas to receive the first radio signal 104 and/or the second radio signal 204. The radio receiver 300 may contain a plurality of channel decoders 230 to be used in a MIMO (multiple input/multiple output) environment. When implementing two independent codewords, for example, the first channel decoder may decode the first codeword while the second channel decoder independently decodes the second codeword. Alternatively the radio receiver contains a single decoder to decode both codewords, e.g. sequentially or in parallel.

The radio receiver may be implemented in downlink as well as in uplink direction, for example implemented in a user equipment to receive radio signals from a mobile station or/and implemented in a mobile station to receive radio signals from a user equipment.

FIG. 5 schematically illustrates a diagram illustrating data throughput versus signal-to-noise ratio of the radio receivers 100, 200 and 300. The diagram illustrates throughput TP of correctly received data symbols versus signal-to-noise ratio $I_{OR}/I_{OC}$. A first graph 501 depicts an optimal throughput for a specific radio channel depending on the signal-to-noise ratio $I_{OR}/I_{OC}$. A second graph 502 depicts a usual throughput of a conventional HARQ protocol using pilot-based channel estimation applied to the specific radio channel. A third graph 503 depicts an increased throughput when using a HARQ/RV protocol using data-based channel estimation applied to the specific radio channel.

When using data-based channel estimation the throughput is increased by ATP at the operating point $I_{OR0}/I_{OC0}$ of equal signal-to-noise ratio compared to pilot-based channel estimation. When using data-based channel estimation the signal-to-noise ratio is decreased by $\Delta I_{OR}/I_{OC}$ at the operating point $I_{OR0}/I_{OC0}$ of equal throughput.

A method for channel estimation includes receiving a first radio signal, equalizing the first radio signal providing an equalized signal and estimating first channel parameters by using the first radio signal and a signal derived from the equalized signal.

In addition, while a particular feature or aspect of an embodiment of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it should be understood that embodiments of the invention may be implemented in discrete circuits, partially integrated circuits or fully integrated circuits or programming means. Also, the terms "exemplary", "for example" and "e.g." are merely meant as an example, rather than the best or optimal. It is also to be appreciated that features and/or elements depicted herein are illustrated with particular dimensions relative to one another for purposes of simplicity and ease of understanding, and that actual dimensions may differ substantially from that illustrated herein.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A radio receiver, comprising:
   an input terminal configured to receive a first radio signal, wherein the first radio signal comprises payload data symbols;
   an equalizer, coupled to the input terminal, configured to equalize the first radio signal and to output an equalized signal;
   a first channel estimator, coupled to the input terminal and the equalizer, configured to estimate first channel parameters by using the first radio signal and a signal derived from the equalized signal, wherein the payload data symbols are ordered in a sequence of data words according to a special rule and the first channel estimator derives the channel parameters by exploiting the special rule; and
   a second channel estimator, coupled to the input terminal, configured to estimate second channel parameters by using a second radio signal received at the input terminal,
   wherein the first radio signal and the second radio signal are different signals, and wherein the first channel parameters and the second channel parameters are different,
   wherein the equalizer is configured to selectively use the first channel parameters or the second channel parameters to equalize the first radio signal.

2. The radio receiver of claim 1, wherein the equalizer is configured to equalize the first radio signal by using the first channel parameters.

3. The radio receiver of claim 1, wherein the first channel estimator and the second channel estimator together comprise a joint channel estimator configured to jointly estimate the first channel parameters and the second channel parameters.

4. The radio receiver of claim 1, wherein the second radio signal comprises pilot symbols.

5. A radio receiver, comprising:
   an input terminal configured to receive a first radio signal, wherein the first radio signal comprises a sequence of data words;
   an equalizer, coupled to the input terminal, configured to equalize the first radio signal and to output an equalized signal;
   a first channel estimator, coupled to the input terminal and the equalizer, configured to estimate first channel parameters by using the first radio signal and a signal derived from the equalized signal, and wherein payload data symbols of a first data word of the sequence of data words are ordered in a first redundancy version;
   a reconstruction unit coupled between the equalizer and the first channel estimator and configured to provide the signal derived from the equalized signal;
   an error detector, coupled to the equalizer, configured to detect an error in the equalized signal and to provide a detection signal indicating the error; and
   a controller, coupled to the error detector, configured to request retransmission of the first data word as a second data word of the sequence of data words if the detection signal indicates an error in the first data word, wherein payload data symbols of the second data word are ordered in a second redundancy version, wherein the reconstruction unit reconstructs the second data word and provides the second data word to the first channel estimator.

6. The radio receiver of claim 5, further comprising:
   a likelihood generator, coupled to the equalizer, configured to generate first likelihood information based on the payload data symbols of the first data word after being equalized by the equalizer.

7. The radio receiver of claim 6, wherein the likelihood generator is configured to generate second likelihood information based on the payload data symbols of the second data word after being equalized by the equalizer.

8. The radio receiver of claim 7, wherein the radio receiver is configured to provide combined likelihood information by combining the first likelihood information and the second likelihood information.

9. The radio receiver of claim 6, wherein the reconstruction unit is configured to provide an estimate of the second data word based on the first likelihood information.

10. The radio receiver of claim 9, wherein the reconstruction unit is configured to provide an estimate of a third data word, wherein the third data word is a retransmission of the second data word upon the detection signal indicating an error in the second data word, wherein payload data symbols of the third data word are ordered in a third redundancy version and the estimate of the third data word is based on the combined likelihood information.

11. The radio receiver of claim 5, further comprising:
    a detection unit, coupled to the equalizer, configured to detect the first data word based on the equalized signal; and
    a reconstruction unit, coupled between the equalizer and the first channel estimator, configured to provide an estimate of the second data word based on the first data word detected by the detection unit.

12. The radio receiver of claim 11, wherein the detection unit is configured to detect the second data word based on the equalized signal and the reconstruction unit is configured to provide an estimate of a third data word, wherein the third data word is a retransmission of the second data word upon the detection signal indicating an error, wherein payload data symbols of the third data word are ordered in a third redundancy version and the estimate of the third data word is based on the second data word detected by the detection unit.

13. The radio receiver of claim 1, wherein the first radio signal is transmitted by one of a UMTS data channel and a UMTS control channel.

14. A method for channel estimation, comprising:
    receiving a first radio signal and a second radio signal;
    estimating second channel parameters by using the second radio signal;
    providing an equalized signal by equalizing the first radio signal; and
    estimating first channel parameters by using the first radio signal and the equalized signal, wherein the first radio signal is equalized by selectively using the first channel parameters or second channel parameters, wherein selection is based on a signal-to-noise ratio or a signal-to-interference-plus-noise ratio or a likelihood ratio, and wherein the first radio signal and the second radio signal are different, and the first channel parameters and the second channel parameters are different.

15. The method of claim 14, wherein the first radio signal comprises a sequence of data words, and wherein data symbols of a first data word of the sequence of data words are ordered in a first redundancy version.

16. The method of claim 15, further comprising:
detecting an error in the equalized signal; and
requesting retransmission of the first data word as a second data word of the sequence of data words, wherein payload data symbols of the second data word are ordered in a second redundancy version.

17. The method of claim 16, further comprising:
deriving first likelihood information from the payload data symbols of the first data word after equalizing the first radio signal; and
reconstructing an estimate of the second data word based on the first likelihood information.

18. A radio receiver, comprising:
an input terminal configured to receive a first radio signal comprising a sequence of data words, wherein a first data word of the sequence of data words is ordered in a first redundancy version;
an equalizer, coupled to the input terminal, configured to equalize the first radio signal by using first channel parameters and to output an equalized signal;
a first channel estimator, coupled to the input terminal and the equalizer, configured to estimate the first channel parameters by using the first radio signal and a signal derived from the equalized signal;
an error detector, coupled to the equalizer, configured to detect an error in the first data word and to provide a detection signal indicating the error;
a controller, coupled to the error detector, configured to request retransmission of the first data word as a second data word of the sequence of data words if the detection signal indicates an error, wherein payload data symbols of the second data word are ordered in a second redundancy version; and
a reconstruction unit, coupled between the equalizer and the first channel estimator, configured to provide the signal derived from the equalized signal as an estimate of the second data word based on the first data word to the first channel estimator.

19. The radio receiver of claim 18, further comprising:
a likelihood generator, coupled to the equalizer, configured to generate likelihood information based on the equalized signal comprising the first data word; and
a buffer, coupled to the likelihood generator, configured to store the likelihood information or information derived from the likelihood information, or both, wherein the reconstruction unit is configured to use a content of the buffer to provide the signal derived from the equalized signal.

20. The radio receiver of claim 19, wherein the controller is configured to use a HARQ protocol for retransmission; and wherein the buffer comprises a HARQ buffer.

21. A radio receiver, comprising:
an input terminal configured to receive a first radio signal comprising payload data symbols and a second radio signal comprising pilot symbols;
an equalizer, coupled to the input terminal, configured to equalize the first radio signal and to output an equalized signal;
a first channel estimator, coupled to the input terminal and the equalizer, configured to estimate first channel parameters by using the first radio signal and a signal derived from the equalized signal, wherein the payload data symbols are ordered in a sequence of data words according to a special rule and the first channel estimator derives the channel parameters by exploiting the special rule; and
a second channel estimator, coupled to the input terminal and the equalizer, configured to estimate second channel parameters by using the second radio signal and pre-determined pilot symbols,
wherein the equalizer is configured to selectively use the first channel parameters or the second channel parameters to equalize the first radio signal, and
wherein the first radio signal and the second radio signal are different, and wherein the first channel parameters and the second channel parameters are different.

22. The method of claim 14, wherein the specific criterion is one of a signal-to-noise ratio and a likelihood ratio.

23. A radio receiver, comprising:
an input terminal configured to receive a first radio signal, wherein the first radio signal comprises payload data symbols;
an equalizer, coupled to the input terminal, and configured to equalize the first radio signal and output an equalized signal; and
a first channel estimator, coupled to the input terminal and the equalizer, and configured to estimate first channel parameters by using the first radio signal and a signal derived from the equalized signal, wherein the payload data symbols are ordered in a sequence of data words according to a special rule and the first channel estimator derives the channel parameters by exploiting the special rule.

24. The radio receiver of claim 23, wherein the first channel estimator comprises a first input configured to receive the first radio signal and further comprises a second input configured to receive a signal derived from the equalized signal.

25. The radio receiver of claim 23, wherein the first channel estimator comprises a correlator to correlate the first radio signal and the signal derived from the equalized signal to determine the first channel parameters.

\* \* \* \* \*